US009225664B2

(12) United States Patent
Dutta

(10) Patent No.: US 9,225,664 B2
(45) Date of Patent: Dec. 29, 2015

(54) SYSTEM AND METHOD FOR AGGREGATING PSEUDOWIRES

(71) Applicant: Pranjal K Dutta, Mountain View, CA (US)

(72) Inventor: Pranjal K Dutta, Mountain View, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 228 days.

(21) Appl. No.: 13/834,504

(22) Filed: Mar. 15, 2013

(65) Prior Publication Data

US 2014/0269735 A1    Sep. 18, 2014

(51) Int. Cl.
*H04L 12/933* (2013.01)
*H04L 12/46* (2006.01)

(52) U.S. Cl.
CPC ............... *H04L 49/10* (2013.01); *H04L 12/46* (2013.01)

(58) Field of Classification Search
CPC ...................................................... H04L 45/68
USPC ......................................................... 370/400
See application file for complete search history.

(56) References Cited

U.S. PATENT DOCUMENTS

| | | | |
|---|---|---|---|
| 8,081,563 B2 | 12/2011 | Guichard et al. | |
| 8,160,055 B1 * | 4/2012 | Nadeau et al. | 370/351 |
| 2004/0156313 A1 * | 8/2004 | Hofmeister et al. | 370/229 |
| 2004/0170173 A1 * | 9/2004 | Pan et al. | 370/392 |
| 2005/0238049 A1 * | 10/2005 | Delregno | 370/466 |
| 2006/0285500 A1 * | 12/2006 | Booth et al. | 370/250 |
| 2006/0291445 A1 | 12/2006 | Martini et al. | |
| 2007/0025241 A1 * | 2/2007 | Nadeau et al. | 370/229 |
| 2008/0144632 A1 * | 6/2008 | Rabie et al. | 370/395.5 |
| 2008/0240101 A1 * | 10/2008 | Shao et al. | 370/392 |
| 2008/0259931 A1 * | 10/2008 | Papadimitriou | 370/395.3 |
| 2010/0246603 A1 * | 9/2010 | Rabie et al. | 370/466 |
| 2012/0327941 A1 * | 12/2012 | Villamizar | 370/394 |
| 2013/0259067 A1 * | 10/2013 | Agmon | 370/468 |

OTHER PUBLICATIONS

The International Search Report and The Written Opinion of the International Searching Authority, or The Declaration in PCT/US2014/021621, mailed Aug. 19, 2014, Alcatel Lucent, Applicant, 8 pages.

* cited by examiner

*Primary Examiner* — Jay P Patel
(74) *Attorney, Agent, or Firm* — Wall & Tong, LLC

(57) ABSTRACT

Systems, methods, architectures and/or apparatus for implementing Multi-Segment Pseudo Wire (MS-PW) arrangements in an efficient and scalable manner.

19 Claims, 5 Drawing Sheets

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|TYPE (AGG. TARG. FEC. STACK) |      LENGTH (VARIABLE)         |
+-+-+-+-+-+-+-+-+-+-+-+-+-+-+-+-+-+-+-+-+-+-+-+-+-+-+-+-+-+-+-+-+
|                    TARGET FEC STACK TLV                      |
+-+-+-+-+-+-+-+-+-+-+-+-+-+-+-+-+-+-+-+-+-+-+-+-+-+-+-+-+-+-+-+-+
```

FIG. 5

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|TYPE (SERV.TARGET.FEC.STACK) |      LENGTH (VARIABLE)         |
+-+-+-+-+-+-+-+-+-+-+-+-+-+-+-+-+-+-+-+-+-+-+-+-+-+-+-+-+-+-+-+-+
|             TARGET FEC STACK TLV FOR SERVICE FEC             |
+-+-+-+-+-+-+-+-+-+-+-+-+-+-+-+-+-+-+-+-+-+-+-+-+-+-+-+-+-+-+-+-+
|            TARGETED FEC STACK TLV FOR AGGREGATE FEC          |
+-+-+-+-+-+-+-+-+-+-+-+-+-+-+-+-+-+-+-+-+-+-+-+-+-+-+-+-+-+-+-+-+
```

FIG. 6

SYSTEM AND METHOD FOR AGGREGATING PSEUDOWIRES

FIELD OF THE INVENTION

The invention relates generally to communication networks and, more specifically but not exclusively, to mechanisms for implementing Multi-Segment Pseudo Wire (MS-PW) arrangements in an efficient and scalable manner.

BACKGROUND

Label Distribution Protocol (LDP) enables peer label switch routers (LSRs) in a Multi-Protocol Label Switching (MPLS) network to exchange label binding information for supporting hop-by-hop forwarding. Various Layer 2 services (such as Frame Relay, Asynchronous Transfer Mode, Ethernet and the like) may be emulated over an MPLS backbone by encapsulating the Layer 2 Protocol Data Units (PDU) and transmitting them over a pseudowire (PW). Various protocols for establishing and maintaining pseudowires using extensions to LDP, for encapsulating Layer 2 PDUs and so on are described in more detail in various Internet Engineering Task Force (IETF) Requests for Comment (RFC), such as RFC4447 and related documents.

A Multi-Segment PW (MS-PW) is a set of two or more contiguous PW segments stitched together that behave and function as a single point-to-point PW. A MS-PW enables service providers to extend the reach of PWs across multiple Packet Switch Network (PSN) domains.

In a typical MS-PW implementation, a first service provider edge (S-PE) device acts as gateway for a first group of Terminating Provider Edge (T-PE) devices in a first autonomous system (AS). The S-PE device communicates with a second S-PE device in a second AS, which in turn is acting as a gateway for a second group of T-PE devices in the second AS. The first and second S-PEs are switching PEs connecting the first and second two autonomous systems, where two segments of a MS-PW are stitched together. Each S-PE maintains both control plane and data plane states for each MS-PW and participates in all Operations, Administration and Maintenance (OAM) for the MS-PWs.

Unfortunately, the typical implementation suffers from a number of limitations that result in poor scalability and other problems, such as:

(1) A S-PE needs to allocate labels from its global label space for setting up each MS-PW routed through that S-PE. Since the S-PE label space is shared by many MPLS based applications including the MPLS based PSN tunnels, the S-PE needs to maintain a high volume of control plane and data plane states for the MS-PWs stitched at the S-PE.

(2) Since every S-PE does PW segment stitching, every S-PE must participate in PW OAM functions.

(3) The MS-PW set-up and maintenance procedure causes control plane congestion at S-PEs. For example, an S-PE needs to participate in PW Status Signaling for various maintenance procedures on each MS-PW routed through it. Further, if a S-PE needs to handle network event such as failure of PW next-hops or requires re-routing then it incurs a very high volume of control plane exchanges between participating S-PE devices. LDP is the default signaling protocol for PWs and is a TCP based protocol. High volume of LDP protocol exchanges causes TCP congestion at S-PEs and impacts other essential services that use same LDP session.

(4) Each S-PE needs to maintain an ever larger number of control plane states as the number of PWs routed through the S-PE grows. The control plane has limited memory and thus limits the number of MS-PW services that can be offered by an AS.

SUMMARY

Various deficiencies in the prior art are addressed by systems, methods, architectures and/or apparatus for implementing Multi-Segment Pseudo Wire (MS-PW) arrangements in an efficient and scalable manner.

In various embodiments, multiple PWs are combined to build an Aggregate Pseudowire (Aggregate PW) and multiple Aggregate PWs are combined to build a Service Pseudowire (Service PW). In this manner, various hierarchical and/or compound structures are formed in a manner enabling efficient scaling of the basic PW mechanism.

A method according to one embodiment comprises establishing, at a service provider edge (S-PE) device, a first aggregate pseudowire (A-PW) between a pair of Terminating Provider Edge (T-PE) devices, said first A-PW comprising a Multi-Segment PW (MS-PW) of a first service class for supporting one or more service pseudowires (S-SWs) between said pair of T-PEs, said S-SWs comprising single-segment PWs (SS-PWs) of said first service class.

BRIEF DESCRIPTION OF THE DRAWINGS

The teachings herein can be readily understood by considering the following detailed description in conjunction with the accompanying drawings, in which:

FIG. 5 depicts an exemplary format for an Aggregate FEC Stack Type;

FIG. 6 depicts an exemplary format for a Service FEC Stack Type; and

To facilitate understanding, identical reference numerals have been used, where possible, to designate identical elements that are common to the figures.

DETAILED DESCRIPTION OF THE INVENTION

The invention will be discussed within the context of systems, methods, architectures and/or apparatus implementing an "Aggregate Pseudowire" (Aggregate PW) which may be used to build a "Service Pseudowire" (Service PW) or a PW hierarchy formed using a plurality Service PWs with an Aggregate PW base, and/or other compound PW structures.

Segmenting a PW into multiple segments may be driven by a variety of reasons, including (1) ability to span a PW across multiple PSN domains; (2) avoid direct T-LDP sessions between "Terminating" Provider Edge Devices (T-PEs), which requires the creation of a full mesh of T-LDP sessions between the T-PEs and leads to severe scalability implications; (3) when PW spans across multiple administrative domains (ADs) or autonomous systems (ASs) due to policy reasons direct T-LDP sessions are not presently allowed between T-PEs.

In various embodiments, the Aggregate PW base of a PW hierarchy is the only Multi-Segment PW element that is visible to service provider edge (S-PE) devices (i.e., the Service PWs are opaque to S-PEs). In this manner, an Aggregate Pseudowire reduces the control plane and data plane states required to maintain the MS-PWs at S-PEs, as well as MS-PW maintenance overhead.

In various embodiments, an S-PE is able to reduce the control and data plane states to total number of T-PEs located in the AS/Region served by the S-PE, rather than the total number of MS-PWs originated from all T-PEs. Due to reduction of control plane and data plane overheads at S-PE, it can perform several MS-PW functions more efficiently such as fast rerouting of PW services or efficient maintenance procedures and the like.

Thus, the various embodiments will be described within the context of a hierarchical MS-PW architecture formed using two fundamental building blocks; namely, an Aggregate PW (A-PW) and a Service PW (S-PW). Various systems, apparatus, methods, mechanisms, procedures, techniques and the like will also be discussed to illustrate this architecture. The various embodiments may be built on existing PW implementations if an appropriate set of extensions is provided to enable the necessary functionality as discussed herein.

Figure 1:
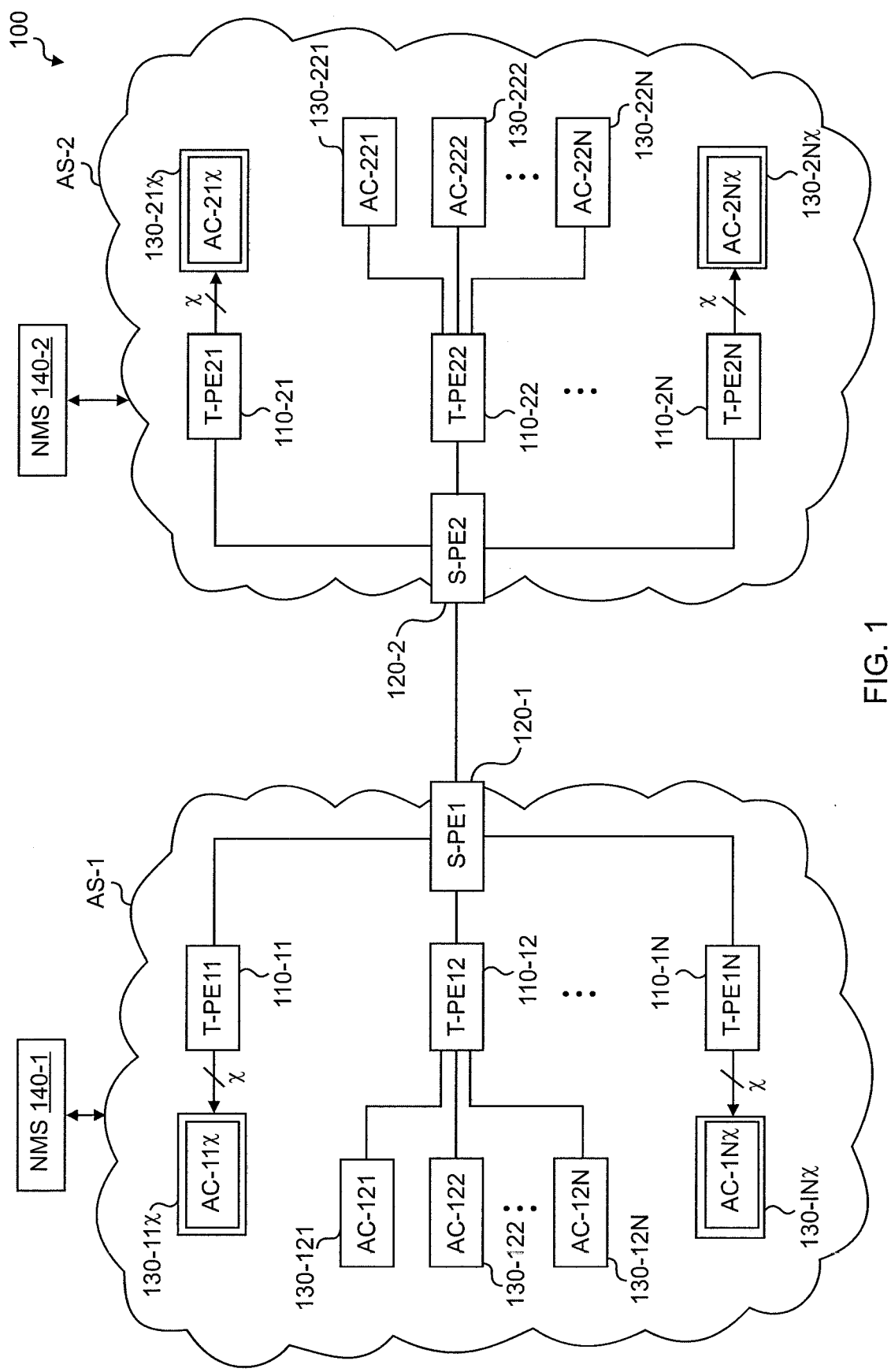
FIG. 1 depicts a high-level block diagram of a system benefiting from various embodiments.

FIG. 1 depicts a high-level block diagram of a system benefiting from various embodiments. Specifically, the system 100 of FIG. 1 depicts two administrative domains (ADs) or autonomous systems (ASs) having provider edge (PE) equipment in communication according to the various embodiments described herein. The specific architecture of the system 100 is illustrative only; various modifications to this architecture are contemplated by the inventors and may be readily made by those skilled in the art informed by the teachings herein.

First autonomous system AS-1 includes a plurality of terminating provider edges (T-PEs) devices 110-11 through 110-1N (collectively T-PEs 110-1x), each of which is depicted as communicating with a service provider edge (S-PE) device 120-1. Each of the T-PEs 110-1x comprises a customer edge (CE) device including a plurality of "native" service ports 130. For example, second T-PE 110-12 is depicted as being connected to a plurality of service ports 130-121 through 130-12N (collectively service ports 130-12x).

Second autonomous system AS-2 includes a plurality of terminating provider edge (T-PEs) devices 110-21 through 110-2N (collectively T-PEs 110-2x), each of which is depicted as communicating with a service provider edge (S-PE) device 120-2. Each of the T-PEs 110-2x comprises a customer edge (CE) device including a plurality of "native" service ports 130. For example, second T-PE 110-22 is depicted as being connected to a plurality of service ports 130-221 through 130-22N (collectively service ports 130-22x).

Each of the first and second autonomous systems AS-1 and AS-2 may be associated with a respective network management system (NMS) 140, which may be implemented at a network node, network operations center (NOC) or any other location capable of communication with the various network elements to be managed thereby. The NMS 140 may support user interface capabilities to enable one or more users to perform various network management, configuration, provisioning or control related functions (e.g., enter information, review information, initiate execution of various methods as described herein and the like). Various embodiments of the NMS 140 are adapted to perform functions as discussed herein with respect to the various embodiments. The NMS 140 may be implemented as a general purpose computing device or specific purpose computing device, such as described below with respect to FIG. 7.

The system 100 of FIG. 1 is depicted as including two S-PEs. However, various embodiments require only a single S-PE or network element implementing a similar function. Generally speaking, the S-PE is used to support one or more A-PWs established between a pair of T-PE devices (in the same or different AS). Each A-PW comprises a Multi-Segment PW (MS-PW) having associated with it a specific service class for supporting traffic of that service class on one or more S-PWs between the pair of T-PEs. The S-PWs supported by an A-PW effectively comprise single-segment PWs (SS-PWs) having the same service class as the A-PW.

An Aggregate PW is defined herein as a MS-PW operating as a "Carrier" or "Bearer" PW that is set up between two T-PEs. One or more Service Pseudowires may be built on top of a single Aggregate PW in a hierarchical fashion. Thus a Service PW is a Single Segment PW (SS-PW) that has significance between two T-PEs only and is opaque to all S-PEs over which the bearer Aggregate MS-PW is routed.

An Aggregate Pseudowire reduces the control plane and data plane states required to maintain the traditional MS-PWs at S-PEs as well as MS-PW maintenance overheads by manifolds. In this manner, an S-PE may be able to reduce the control and data plane states to total number of T-PEs located in the AS/Region served by the S-PE as opposed to total number of MS-PWs originated from all T-PEs.

Multiple Aggregate MS-PWs may be set-up between a pair of T-PEs based on various criteria, such as: (1) using different Aggregate PWs to provide different class of services for diverse QoS guarantees; (2) satisfying diverse path routing requirements of Service PWs, where sets of Service PWs are routed over disjoint paths for fate separation such that each set has to be mapped over a different Aggregate PW routed via disjoint path; (3) satisfying different PSN requirements at the S-PEs through which Aggregate PWs are routed; (4) providing different services types of PW emulation services (Ethernet, Frame Relay, ATM) between a pair of T-PEs—at least one Aggregate PW is required for each type and so on.

A Service PW is defined herein as a MS-PW operating as a "Carrier" or "Bearer" PW that is set up between two S-PEs and is built upon an Aggregate PWs after the Aggregate PWs have been successfully set up between their respective T-PEs. The Service PW operates as a virtual overlay on top of an Aggregate PW and forms thereby a PW hierarchy. A single Aggregate MS-PW can act as bearer channel for multiple Service PWs.

The S-PEs perform data plane stitching functions for the Aggregate PW only and thus the Aggregate PW is the only MS-PW that gets set-up at S-PE. The Service PWs are Single-Segment PWs (SS-PWs) set up between the T-PEs since those are overlaid on top of an Aggregate MS-PW.

The PW set up message of a Service PW carries two forwarding equivalence class (FEC) elements—the Service PW FEC element and the Aggregate PW FEC element and both must be of same FEC type. Various PW FEC elements are described in RFC 4447 and RFC 5003 in IETF. The label set up messages received for Service Pseudowires are simply relayed by an S-PE to the next-hop PE router of the corresponding Aggregate PW. An S-PE neither maintains control plane state nor data plane state for the Service PWs. Here the label set up message means a LDP Label Mapping, Label Withdraw or Label Release Message.

Figure 2:
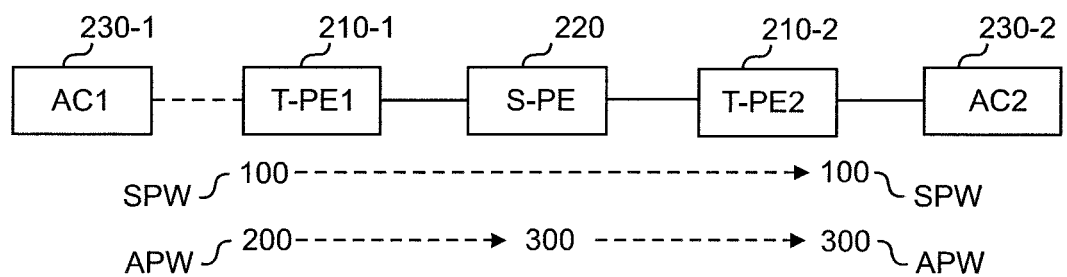
FIG. 2 depicts a high level block diagram of a portion of the system of FIG. 1.

FIG. 2 depicts a high level block diagram of a portion of the system 100 described above with respect to FIG. 1. In particular, FIG. 2 depicts a S-PE 220 disposed between a pair of T-PEs; namely, T-PE1 210-1 and T-PE2 210-2, where each of the T-PEs 210 includes a service port 230 supporting a common type of native service (e.g., voice, data and the like) flowing from T-PE1 to T-PE-2. A reverse service may also be implemented, such as for a voice call or other bidirectional Layer 2 service.

FIG. 2 also graphically depicts the attachment of Service and Aggregate PW labels to the data packets of the native service emulated by the Aggregate PW from T-PE1 towards T-PE2, via S-PE 220.

Figure 3:
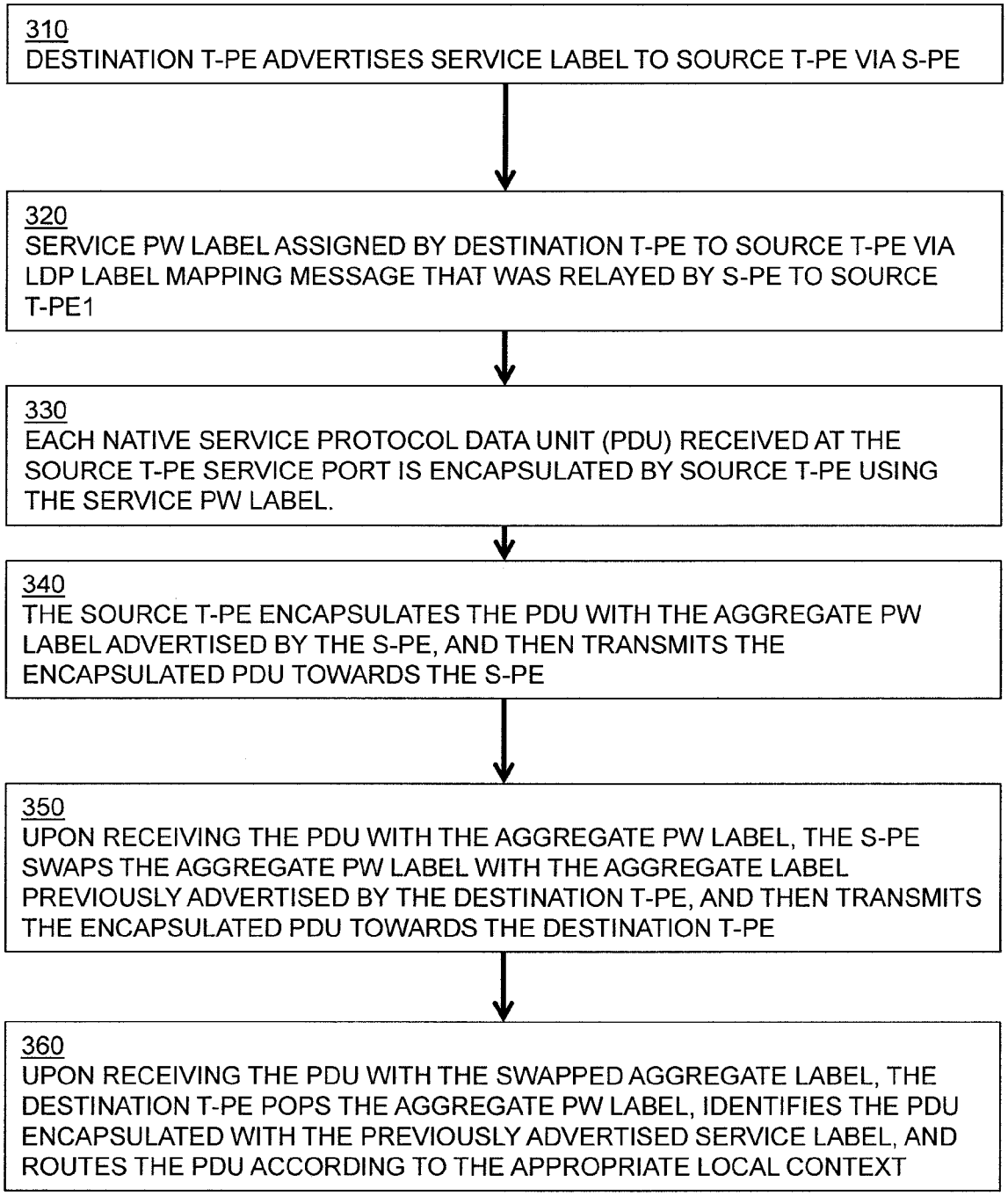
FIG. 3 depicts a flow diagram of a method according to one embodiment.

FIG. 3 depicts a flow diagram of a method according to various embodiments. FIG. 3 will be discussed along with FIGS. 1-2 to describe A-PW and S-PW setup between a pair of T-PEs.

At step 310, the destination T-PE advertises a label toward the source T-PE via the S-PE for the Aggregate PW. For example, referring to FIG. 2, T-PE2 advertises a Label 300 to S-PE; S-PE then advertises a label 200 toward T-PE1. Thus the Aggregate PW label is switched at S-PE from 200 to 300.

At step 320, a service PW label is assigned by a destination T-PE to a source T-PE1 via a LDP label mapping message relayed by the S-PE to the source T-PE1. For example, referring to FIG. 2, a label 100 is the Service PW label assigned by T-PE2 to T-PE1 in a LDP Label Mapping Message relayed by the S-PE to the T-PE1 on receipt of the message from T-PE2. It is noted that the Aggregate PW is the MS-PW that is set up between the source T-PE (e.g., T-PE1) and the destination T-PE (e.g., T-PE2) and switched at the S-PE.

Since a PW is typically bi-directional, a label set up procedure occurs from T-PE1 towards T-PE2 for both the PWs, which procedure is performed in substantially the same manner. AC1 230-1 and AC2 230-2 are the "native" service ports connected to Customer Edge (CE) devices of T-PE1 and T-PE2 respectively. Such native services can be any service such as Ethernet, Frame Relay, ATM and so on being emulated over a Service PW.

Packet flow of the native service between T-PE1 and T-PE2 may now occur.

At step 330, each native service, Layer 2 Protocol Data Unit (PDU) received at the source T-PE service port is encapsulated by source T-PE using the Service PW label. For example, referring to FIG. 2, each native service, Layer 2 Protocol Data Units (PDU) received from service port AC1 is encapsulated by T-PE1 in the Service PW label 100, which identifies the PW over which the service is emulated.

At step 340, the source T-PE encapsulates the PDU with the aggregate PW label advertised by the SPE, and then transmits the encapsulated PDU towards the SPE. For example, referring to FIG. 2, T-PE1 further encapsulates the PDU with the Aggregate PW Label 200 advertised by S-PE, and then transmits the encapsulated PDU toward S-PE 220.

At step 350, upon receiving the PDU with the aggregate PW label, the SPE swaps the aggregate PW label with the aggregate PW label previously advertised by the destination T-PE, and then transmits the encapsulated PDU towards the destination T-PE. For example, referring to FIG. 2, upon receiving the PDU with the Aggregate PW Label 200, S-PE 220 swaps the Aggregate PW Label 200 with the Label 300 previously advertised by T-PE2, and forwards the PDU with the Label 300 towards T-PE2. S-PE does not participate in any switching function for the Service Label 100.

At step 360, upon receiving the PDU with the aggregate PW label swapped at step 350, the destination T-PE pops the aggregate PW label, identifies thereunder the PDU slated with the previously advertised service label, which PDU is then routed according to the appropriate local context. For example, referring to FIG. 2, upon receiving the PDU with the Label 300, T-PE2 pops the Aggregate PW Label 300 and identifies thereunder the Service PW Label 100 that was previously advertised. T-PE2 also pops the Service PW Label 100 and, based on its local context, the native service PDU is transmitted via the service port toward AC2.

Aggregate FEC TLV

Figure 4:
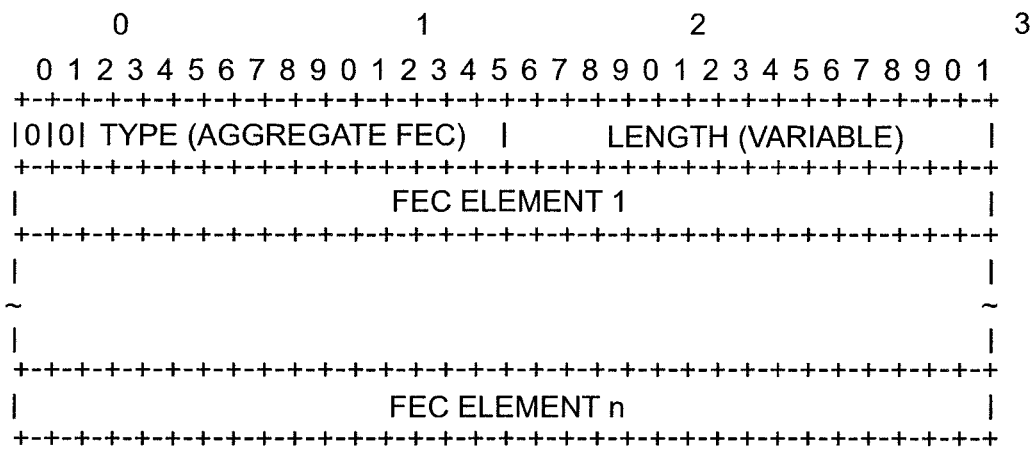
FIG. 4 depicts an exemplary format for an Aggregate FEC TLV.

Various embodiments use a new type-length-value (TLV) element denoted herein as a "LDP Aggregate FEC" TLV for Label Set up procedures for Aggregate PW. In one embodiment, the format for Aggregate FEC TLV is shown in FIG. 4 and described below. In various embodiments, the TLV type is assigned from Vendor Assigned LDP TLV Type space, such as discussed in more detail in IETF RFC5036. In other embodiments, TLV type is standardized from IANA (Internet Assigned Naming Authority) to provide interoperability with other vendor devices.

FIG. 4 depicts an exemplary format for an Aggregate FEC TLV. In particular, the Aggregate FEC TLV of FIG. 4 comprises a plurality of FEC elements denoted as FEC Element 1 to FEC Element n. The Aggregate FEC TLV contains several FEC Elements and may be any FEC element types defined in various LDP specifications in IETF. In various embodiments, the Aggregate FEC TLV is also applicable to any "non" PW specific FEC Element types. Thus, the various embodiments described herein are adapted to utilize the Aggregate FEC TLV of FIG. 4 and, further, the PW FEC Elements defined in IETF RFC4447 and RFC5003.

In various embodiments, the Aggregate MS-PW may be set up via manual configuration (i.e., without a signaling protocol). In various embodiments, an Aggregate PW FEC is identified by an Aggregate FEC TLV in LDP messages. The Aggregate FEC TLV contains the PW FEC Elements. The Aggregate PW set up follows MS-PW signaling procedures.

An Aggregate MS-PW OAM (Operations, Administration and Maintenance) generally follows MS-PW OAM procedures, such as those defined in IETF RFC6073. OAM functions must encode an Aggregate FEC TLV instead of FEC TLV in OAM procedures that associate a context of a FEC. Further, IETF RFC6073 defined MS-PW OAM procedures use the encoding defined in RFC 4379. RFC 4379 defines "Target FEC Stack" as the context of the FEC Element on which an OAM operation is being performed.

Aggregate FEC Stack Type

Various embodiments utilize a newly defined Target FEC Stack Type for OAM operations for an Aggregate FEC and termed as "Aggregate Target FEC Stack" Type. Various implementations may also define their own type code point.

FIG. 5 depicts an exemplary format for an Aggregate FEC Stack Type. In particular, the Aggregate FEC Aggregate FEC Stack Type of FIG. 5 follows the general format of Target FEC Stack TLV as defined in RFC4379. The value field contains in turn another Target FEC Stack TLV that identifies the FEC Element in the Aggregate FEC TLV.

In various embodiments, QoS signaling of an Aggregate PW follows various IETF procedures. When an Aggregate PW is provisioned between a pair of T-PEs that needs to provide QoS guarantees, then the active T-PE assigns an "Aggregate" Bandwidth to the PW which gets signaled in PW set up messages. The active T-PE may calculate the Aggregate Bandwidth based on the aggregate QoS requirements of all the member service PWs that are transported over the Aggregate PW.

In various embodiments, service PWs are always SS PWs (Single Segment PWs) between a pair of T-PEs that are set up in the context of an Aggregate PW. Service PWs are identified by, illustratively, a regular FEC TLV such as defined in IETF RFC5036, but further carrying an Aggregate FEC TLV to identify its "bearer" context.

In various embodiments, service PW set up follows procedures such as described in RFC4447, with some or all of the following exceptions.

(1) A T-PE must complete set up of an Aggregate MS-PW before initiating any Service PW that uses that Aggregate PW as the bearer. MS-PW set up requires the "active" or "passive" role election procedures between two T-PEs as it is needed to follow same "switched" path in both directions of the PW. There is no such notion with Service PWs since Service PWs are SS-PWs.

(2) A T-PE that initiates Service PW set up request must include FEC TLV that identifies the Service PW FEC Element and the Aggregate FEC TLV that identifies its corresponding bearer FEC Element.

(3) Upon receiving a Service PW label mapping message by a S-PE or T-PE, the S-PE or T-PE must inspect the FEC TLV and the Aggregate FEC TLV. The S-PE will check if the bearer Aggregate PW is already installed. If not then the S-PE would release the received label with a Label Release Message with a status code such as "NO_AGGREGATE_FEC". This is a new LDP status code defined herein.

(4) An implementation can define its own LDP status code point that is available. If interoperability is required then the status code can be standardized in IETF and code point can be obtained from IANA.

(5) If the S-PE finds that the Aggregate PW is already installed then it should forward the Service PW set up message to the S-PE or T-PE which is next signaling hop for the Aggregate PW. It is noted that the S-PE forwards the received Label Mapping Message transparently since the S-PE typically does not switch the Label for Service PWs.

(6) If a T-PE finds that the Service PW is already installed in the context of a different Aggregate FEC than the one received in the label mapping already installed then it releases the received label mapping with status code such as "DUPLICATE_AGGREGATE_FEC". This is a new LDP status code defined herein. An implementation can define its own LDP status code point that is available. If interoperability is required, then the status code can be standardized in IETF and code point can be obtained from IANA.

In various embodiments, certain Failure Handling Procedures are implemented. For example, since a Service PW is a SS-PW between two T-PEs, failure handling procedures as defined in RFC4447 may be used, with the exceptions for bearer Aggregate PW Failure handling procedures as described herein. In various embodiments, substantially all PW Status Signaling Procedures defined in section 5.4 of IETF RFC4447 are applicable to Service PWs. Status Changes on an Aggregate MS-PW are propagated to its member Service PWs automatically and thus completely avoid status signaling at per Service PW level.

In various embodiments, certain OAM Functions are implemented. For example, in various embodiments a Service PW follows substantially all Virtual Circuit Connectivity Verification (VCCV) OAM procedures as defined in RFC5085 that are applicable to SS-PW, with following exceptions:

(1) Since a Service PW is mapped over Aggregate PW, any OAM operation on a Service PW needs to carry context of the bearer Aggregate FEC. Therefore, various embodiments utilize new extensions as defined herein.

(2) IETF RFC5085 defined MS-PW OAM procedures use the encoding defined in RFC 4379. RFC 4379 defines "Target FEC Stack" as the context of the FEC Element on which an OAM operation is being performed. Therefore, various embodiments utilize a new Target FEC Stack Type as defined herein for OAM operations required for a Service FEC and termed as "Service Target FEC Stack" Type. Thus, various embodiments or implementations may define their own type code point.

Service FEC Stack Type

FIG. 6 depicts an exemplary format for a Service FEC Stack Type. In particular, the Service FEC Aggregate FEC Stack Type of FIG. 6 follows the general format of Target FEC Stack TLV as defined in IETF RFC4379, except that the value field contains an additional two Target FEC Stack TLVs. Specifically, a first of the additional Target FEC Stack TLVs identifies the FEC Element in the FEC TLV indentifying the Service PW, while a second of the additional Target FEC Stack TLVs comprises an Aggregate Target FEC Stack TLV as previously described.

Generally speaking, substantially all of the OAM receiver procedures defined in IETF RFC5085 must check for validity of mapping between Service PW to its Aggregate PW both in data plane and in control plane.

In various embodiments, certain QoS Signaling is provided. For example, since a Service PW is typically a SS-PW, it does not require explicit provision of Bandwidth per Service PW at S-PE. Thus, the QoS requirements of Service PWs may be exclusively managed by T-PEs alone without involvement of S-PEs. The Service PW QoS requirements may be met by selecting an Aggregate PW that meets the QoS/Bandwidth requirements. Once T-PE selects such an Aggregate PW, then the T-PE may perform traffic accounting or policing functions for the Service PW. As S-PEs do not maintain any "permanent" state for Service PWs mapped over an Aggregate PW, so S-PEs cannot perform policing or accounting functions for the Aggregate PW as a whole.

When a T-PE needs to initiate a Service PW set up and finds that no existing Aggregate PW meets the QoS requirements, it may perform any of the following functions:

First, the T-PE sets up a new Aggregate PW with an aggregate bandwidth to meet future requirements.

Second, the T-PE attempts resignaling bandwidth of an existing Aggregate PW with higher bandwidth. If bandwidth resignaling is successful, then the Service PW is mapped on the Aggregate PW. If bandwidth resignaling is not successful, then the T-PE may initiate a new Aggregate PW set up to map the Service PW and meet its QoS requirements.

The Service PW setup message may carry a Bandwidth TLV to enable a remote T-PE to perform policing or accounting functions. Since there is no "active" or "passive" role associated with Service PW set up, either or both T-PEs may signal their individual bandwidth requirements. The Service PW bandwidth signaled by the T-PE that plays active role of the corresponding Aggregate PW only gets applied at both T-PEs for traffic policing or accounting functions.

Figure 7:
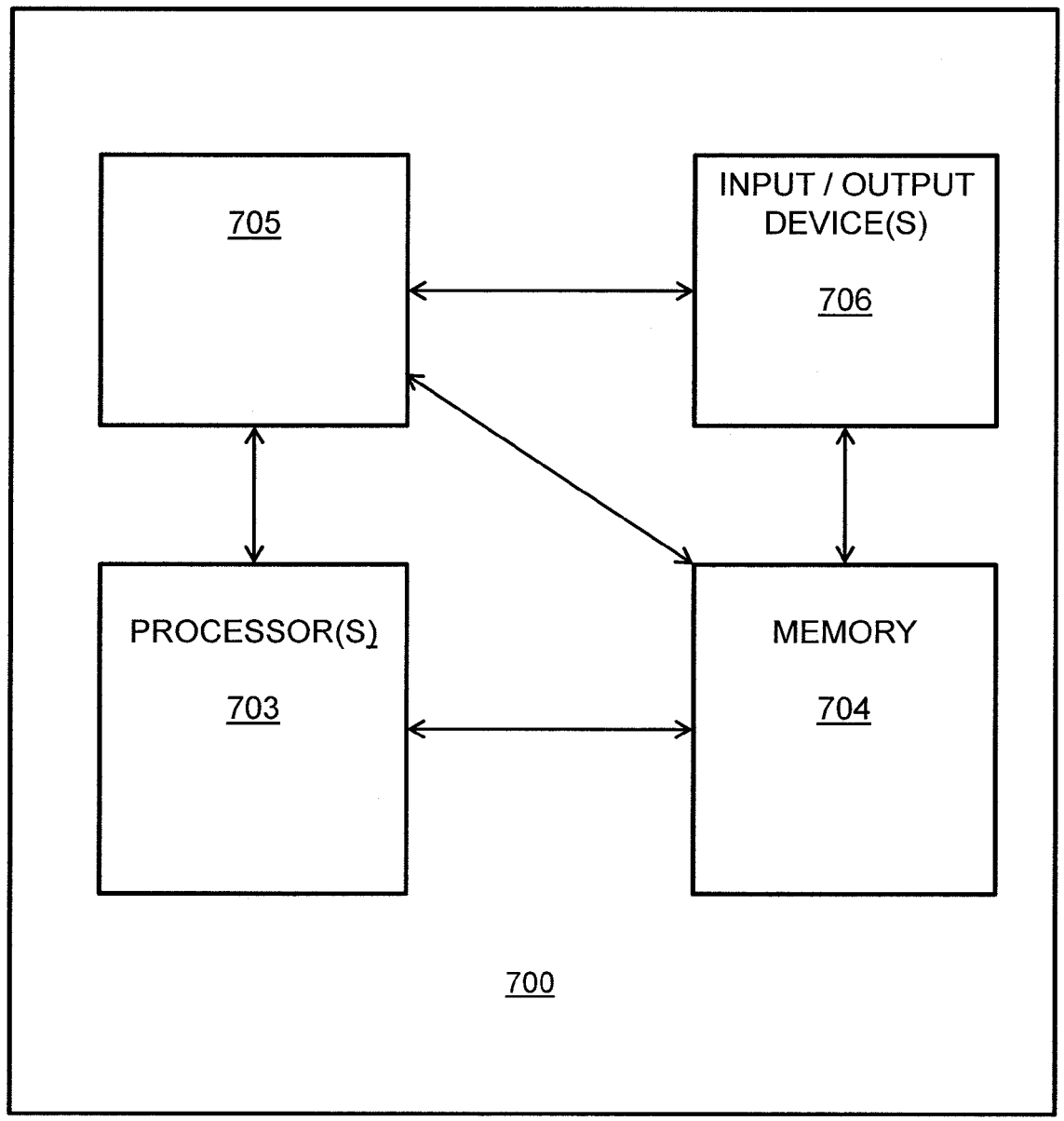
FIG. 7 depicts a high-level block diagram of a computing device suitable for use in performing the functions described herein.

FIG. 7 depicts a high-level block diagram of a computing device, such as a processor in a telecom network element, suitable for use in performing functions described herein, such as the various network management functions, LSR functions, encapsulation functions and so on associated with the various elements described above with respect to the figures.

As depicted in FIG. 7, computing device 700 includes a processor element 703 (e.g., a central processing unit (CPU) and/or other suitable processor(s)), a memory 704 (e.g., random access memory (RAM), read only memory (ROM), and the like), a cooperating module/process 705, and various input/output devices 706 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

It will be appreciated that the functions depicted and described herein may be implemented in software and/or in a combination of software and hardware, e.g., using a general purpose computer, one or more application specific integrated circuits (ASIC), and/or any other hardware equivalents. In one embodiment, the cooperating process 705 can be loaded into memory 704 and executed by processor 703 to implement the functions as discussed herein. Thus, cooperating process 705 (including associated data structures) can be stored on a computer readable storage medium, e.g., RAM memory, magnetic or optical drive or diskette, and the like.

It will be appreciated that computing device 700 depicted in FIG. 7 provides a general architecture and functionality suitable for implementing functional elements described herein or portions of the functional elements described herein.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods and/or techniques described herein are invoked or otherwise provided. Instructions for invoking the inventive methods may be stored in tangible and non-transitory computer readable medium such as fixed or removable media or memory, transmitted via a tangible or intangible data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A method, comprising:
   establishing, by a service provider edge (S-PE) device comprising a processor and a memory, a first aggregate pseudowire (A-PW) between a pair of Terminating Provider Edge devices (T-PEs), said first A-PW comprising a Multi-Segment PW (MS-PW) of a first service class for supporting one or more service pseudowires (S-PWs) between said pair of T-PEs, said S-PWs comprising single-segment PWs (SS-PWs) of said first service class, wherein said establishing comprises:
   receiving, from a destination T-PE, a first service label advertised towards a source T-PE; and
   advertising, toward a source T-PE, a second service label;
   said first and second service labels forming thereby an A-PW between said source T-PE and said destination T-PE, the A-PW being said first A-PW.

2. The method of claim 1, wherein said establishing further comprises:
   receiving, from said source T-PE, a third service label advertised towards said destination T-PE; and
   advertising, toward said destination T-PE, a fourth service label;
   said third and fourth service labels forming thereby a reverse A-PW between said source T-PE and said destination T-PE, the reverse A-PW being said first A-PW.

3. The method of claim 1, further comprising:
   establishing, by said service provider edge (S-PE) device, a second aggregate pseudowire (A-PW) between said pair of Terminating Provider Edge devices (T-PEs), said second A-PW comprising a Multi-Segment PW (MS-PW) of a second service class for supporting one or more service pseudowires (S-PWs) between said pair of T-PEs, said S-PWs comprising single-segment PWs (SS-PWs) of said second service class.

4. The method of claim 3, wherein said establishing of said second A-PW comprises:
   receiving, from a destination T-PE, a third service label advertised towards a source T-PE; and
   advertising, toward a source T-PE, a fourth service label;
   said third and fourth service labels forming thereby an A-PW between said source T-PE and said destination source T-PE, the A-PW being said second A-PW.

5. The method of claim 1, wherein said establishing is repeated for each of a plurality of additional service classes to provide thereby a corresponding plurality of aggregate pseudowires (A-PWs) between said pair of T-PEs.

6. The method of claim 1, wherein said establishing is repeated for each of a plurality of additional pairs of T-PEs to provide thereby corresponding A-PWs of said first service class between each of said additional pairs of T-PEs.

7. The method of claim 1, wherein said establishing is performed for each of a plurality of pairs of T-PEs, and for each desired service class of said pairs of T-PEs, to provide thereby an A-PW for each desired service class of each pair of T-PEs.

8. The method of claim 1, wherein said establishing of the first A-PW comprising said MS-PW of the first service class is performed in response to said destination T-PE failing to initiate a S-PW of said first service class with said source T-PE.

9. The method of claim 1, wherein said establishing is repeated for said first service class to provide thereby a corresponding second A-PW of said first service class between said pairs of T-PEs.

10. The method of claim 9, wherein said establishing the second A-PW of said first service class is performed in response to said first A-PW of said first service class having insufficient bandwidth to support a desired S-PW of said first service class.

11. The method of claim 1, further comprising resignaling bandwidth of an existing A-PW with a higher bandwidth in response to said existing A-PW having insufficient bandwidth to support a desired S-PW.

12. The method of claim 11, further comprising:
    in response to a failure of said resignaling, repeating said establishing to provide thereby a corresponding higher bandwidth A-PW of said first service class between said pairs of T-PEs.

13. The method of claim 1, further comprising establishing a S-PW in response to a S-PW setup message received from a T-PE, said S-PW setup message including a forwarding equivalence class (FEC) type-length-value (TLV) identifying a S-PW FEC Element and an Aggregate FEC TLV that identifies a corresponding bearer FEC Element.

14. The method of claim 13, wherein said S-PW setup message includes a Bandwidth TLV to specify a bandwidth requirement of said S-PW.

15. The method of claim 13, further comprising:
in response to a bearer A-PW indicated by the Aggregate FEC TLV of the S-PW setup message not being established, releasing a received label and providing a Label Release Message having a status code indicative of a missing Aggregate FEC.

16. The method of claim 13, further comprising:
in response to a bearer A-PW indicated by the Aggregate FEC TLV of the S-PW setup message being established, forwarding the S-PW setup message toward a next signaling hop for the Aggregate PW.

17. The method of claim 13, further comprising:
in response to a S-PW FEC Element indicated by the FEC TLV of the S-PW setup message being established in the context of a different A-PW than the bearer A-PW indicated by the Aggregate FEC TLV of the S-PW setup message, releasing a received label and providing a Label Release Message having a status code indicative of a duplicate Aggregate FEC.

18. A telecom network element, comprising:
a processor; and
a memory for storing program logic, the program logic executed by the processor, the program logic comprising:
logic for establishing, at a service provider edge (S-PE) device, a first aggregate pseudowire (A-PW) between a pair of Terminating Provider Edge devices (T-PEs), said first A-PW comprising a Multi-Segment PW (MS-PW) of a first service class for supporting one or more service pseudowires (S-PWs) between said pair of T-PEs, said S-PWs comprising single-segment PWs (SS-PWs) of said first service class, wherein said establishing comprises:
receiving, from a destination T-PE, a first service label advertised towards a source T-PE; and
advertising, toward a source T-PE, a second service label;
said first and second service labels forming thereby an A-PW between said source T-PE and said destination T-PE, the A-PW being said first A-PW.

19. A tangible and non-transient computer readable storage medium storing instructions which, when executed by a computer, adapt the operation of the computer to provide a method, the method comprising:
establishing, at a service provider edge (S-PE) device, a first aggregate pseudowire (A-PW) between a pair of Terminating Provider Edge devices (T-PEs), said first A-PW comprising a Multi-Segment PW (MS-PW) of a first service class for supporting one or more service pseudowires (S-PWs) between said pair of T-PEs, said S-PWs comprising single-segment PWs (SS-PWs) of said first service class, wherein said establishing comprises:
receiving, from a destination T-PE, a first service label advertised towards a source T-PE; and
advertising, toward a source T-PE, a second service label;
said first and second service labels forming thereby an A-PW between said source T-PE and said destination T-PE, the A-PW being said first A-PW.

* * * * *